United States Patent
Kohda et al.

(10) Patent No.: US 10,764,657 B2
(45) Date of Patent: *Sep. 1, 2020

(54) ROUTING OF DATA IN NETWORK

(71) Applicant: INTERNATIONAL BUSINESS MACHINES CORPORATION, Armonk, NY (US)

(72) Inventors: Yasuteru Kohda, Kanagawa-ken (JP); Nobuyuki Ohba, Miyagi-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,521

(22) Filed: Oct. 28, 2019

(65) Prior Publication Data
US 2020/0068275 A1 Feb. 27, 2020

Related U.S. Application Data

(63) Continuation of application No. 15/346,875, filed on Nov. 9, 2016, now Pat. No. 10,462,046.

(51) Int. Cl.
| | |
|---|---|
| *H04Q 3/64* | (2006.01) |
| *H04L 12/721* | (2013.01) |
| *H04L 12/717* | (2013.01) |
| *H04L 12/841* | (2013.01) |
| *H04L 12/859* | (2013.01) |
| *H04L 12/725* | (2013.01) |

(52) U.S. Cl.
CPC ............. *H04Q 3/64* (2013.01); *H04L 45/306* (2013.01); *H04L 45/42* (2013.01); *H04L 45/70* (2013.01); *H04L 47/2475* (2013.01); *H04L 47/28* (2013.01)

(58) Field of Classification Search
CPC ..... H04L 47/2475; H04L 45/70; H04L 47/28; H04L 45/42; H04L 45/306
See application file for complete search history.

(56) References Cited

U.S. PATENT DOCUMENTS

| | | |
|---|---|---|
| 8,531,943 B2 | 9/2013 | Olofsson |
| 8,694,704 B2 | 4/2014 | Gratz et al. |
| 9,009,648 B2 | 4/2015 | Kumar et al. |
| 9,130,856 B2 | 9/2015 | Kumar et al. |
| 2014/0092740 A1 | 4/2014 | Wang et al. |

OTHER PUBLICATIONS

List of IBM Patents or Patent Applications Treated as Related dated Oct. 28, 2019, 2 pages.
Ebrahimi, et al. "HARAQ: Congestion-Aware Learning Model for Highly Adaptive Routing Algorithm in On-Chip Networks" Networks on Chip (NoCS), 2012 Sixth IEEE/ACM International Symposium on May 2012, 8 pages.
Manevich, et al. "Centralized Adaptive Routing for NoCs"—IEEE Computer Architecture Letters, vol. 9, No. 2, Jul. 2010, pp. 57-60.

*Primary Examiner* — Gbemileke J Onamuti
(74) *Attorney, Agent, or Firm* — Tutunjian & Bitetto, P.C.; Vazken Alexanian

(57) ABSTRACT

A method for routing data by a node from a plurality of nodes connected by links to form a network includes feeding, to a global bus, local traffic information regarding the node, the global bus being provided separately from the links and spread within the network. The method also includes obtaining, from the global bus, global traffic information regarding other nodes from the plurality of nodes. The method further includes switching a routing path of the data based on at least the local traffic information regarding the other nodes.

13 Claims, 10 Drawing Sheets

ROUTING OF DATA IN NETWORK

BACKGROUND

Technical Field

The present invention relates to routing of data in a network.

Related Art

Recently, various techniques have been known regarding routing of data in a network.

SUMMARY

According to an embodiment of the present invention, a method for routing data by a node from a plurality of nodes connected by links to form a network is provided. The method includes feeding, to a global bus, local traffic information regarding the node, the global bus being provided separately from the links and spread within the network. The method further includes obtaining, from the global bus, global traffic information regarding other nodes from the plurality of nodes. The method further includes switching a routing path of the data based on at least the local traffic information regarding the other nodes.

According to another embodiment of the present invention, a computer program product for routing data by a computer of plural computers connected by links to form a network is provided. The computer program product includes a non-transitory computer readable storage medium having program instructions embodied with the computer readable storage medium. The program instructions are executable by the computer to cause the computer to perform the aforementioned method.

According to another embodiment of the present invention, an apparatus for routing data is provided. The apparatus is one of a plurality of apparatuses connected by links to form a network. The apparatus includes a processor and a memory coupled to the processor. The memory includes program instructions. The program instructions are executable by the processor to cause the processor to perform the aforementioned method.

According to another embodiment of the present invention, a network system for routing data in a network is provided. The network system includes a plurality of nodes each of which routes the data. The network system further includes a plurality of links each of which connects two of the plurality of nodes to form the network. The network system further includes a global bus provided separately from the plurality of links and spread within the network. Each node from the plurality of nodes feeds, to the global bus, local traffic information regarding the each node, obtains, from the global bus, global traffic information regarding other nodes from the plurality of nodes, and switches a routing path of the data based on at least the local traffic information regarding the other nodes.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

Mesh-based networks are widely employed for implementing hardware networks of cognitive systems. Performance of the mesh-based networks is one of the dominant factors that affect overall performance of mesh-based network systems. Routing control, in particular, has an impact on the performance of the mesh-based networks.

In view of this, the exemplary embodiments provide adaptive packet routing schemes for the mesh-based network systems.

First, an exemplary embodiment will be described.

Figure 1:
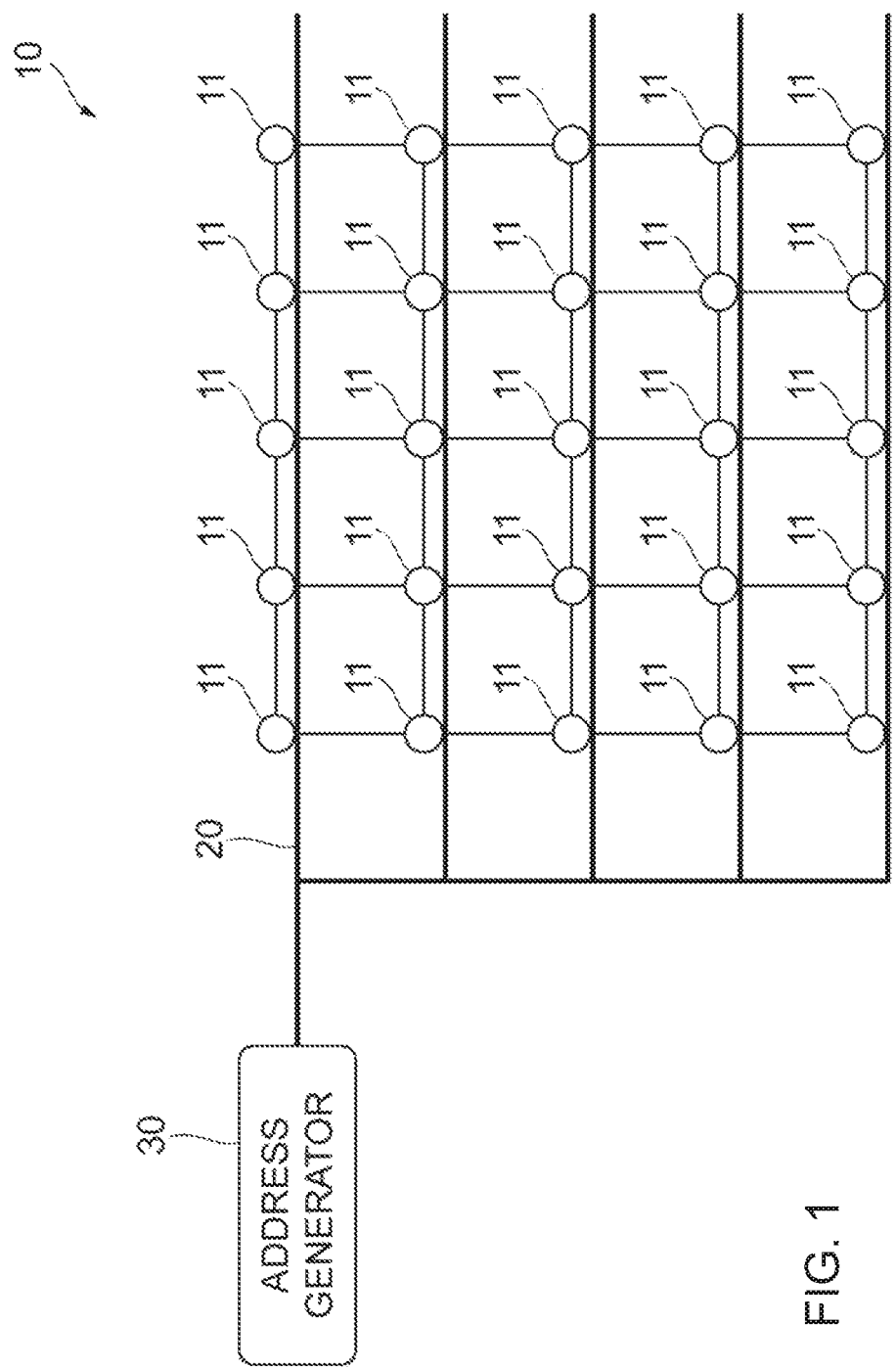
FIG. 1 depicts a block/flow diagram of a mesh-based network system according to an embodiment of the present invention.

Referring to FIG. 1, a block/flow diagram of a mesh-based network system according to an exemplary embodiment is shown. As shown in FIG. 1, the mesh-based network system may include a mesh-based network 10, a shared bus 20, and an address generator 30.

The mesh-based network 10 may be formed by interconnecting a plurality of nodes 11 via a plurality of links. The links may be high-speed links. Although FIG. 1 shows twenty-five nodes 11, the number of the nodes 11 is not limited to this. Further, a network which is not mesh-based may be used instead of the mesh-based network 10. That is, the mesh-based network 10 serves as one example of a network.

The shared bus 20 may be a bus provided separately from the links, and shared by all of the nodes 11 by being spread within the mesh-based network 10. The shared bus 20 may be used for reporting traffic information regarding the nodes 11. In this sense, the shared bus 20 may also be called a "traffic report shared bus". The shared bus 20 serves as one example of a global bus.

The address generator 30 may be a circuit connected to the shared bus 20. The address generator 30 may generate addresses each regarding a corresponding one of the nodes 11, and feed the generated addresses into the shared bus 20. The address generator 30 serves as one example of the generator.

Figure 2:
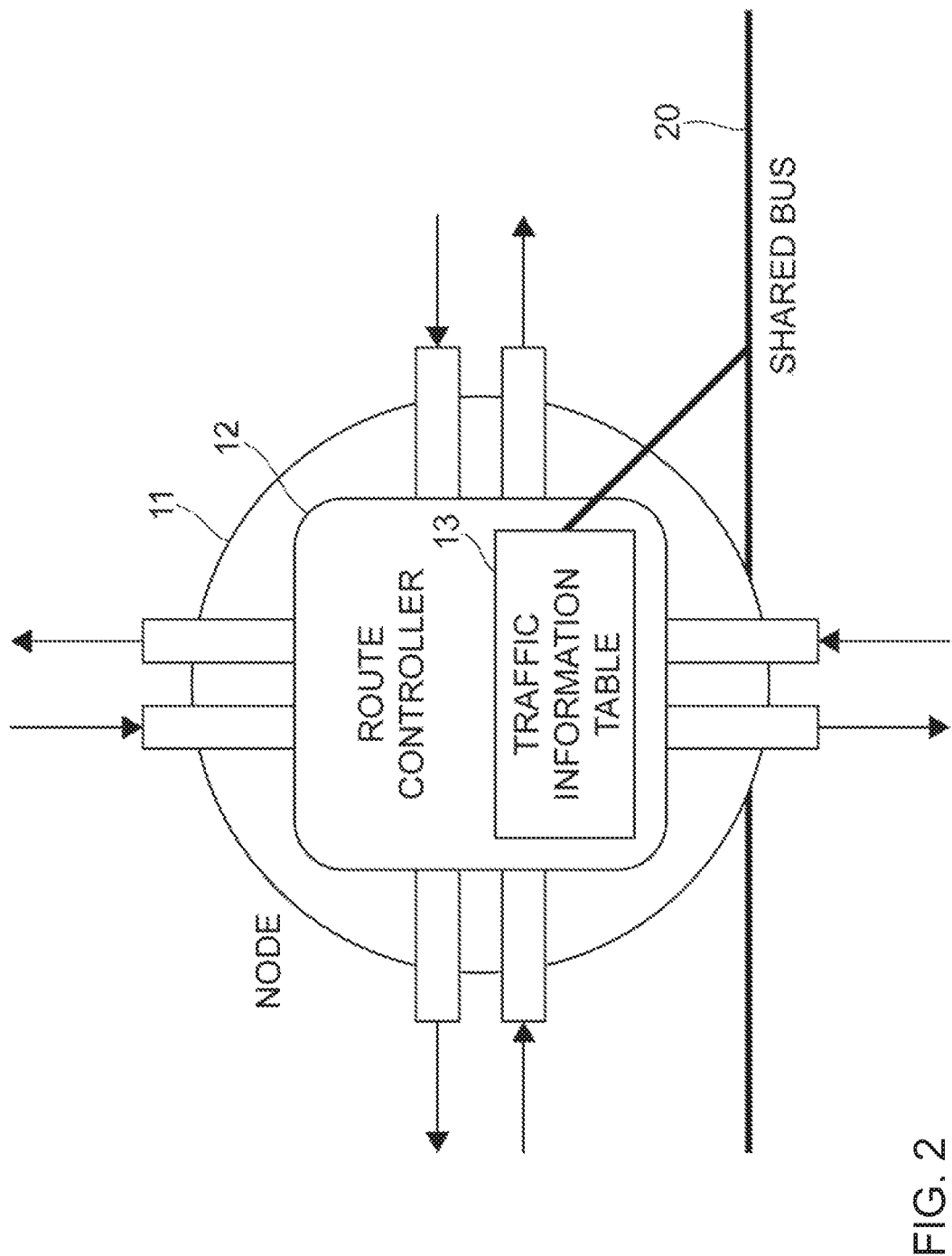
FIG. 2 depicts a block/flow diagram of a node according to an embodiment of the present invention.

Referring to FIG. 2, a block/flow diagram of a node 11 according to an exemplary embodiment is provided. As shown in the figure, the node 11 may include a route controller 12 and a traffic information table 13. Note that FIG. 2 also shows the shared bus 20 although it is not a structural element of the node 11.

The route controller 12 may be connected to the shared bus 20. The route controller 12 may feed periodically local traffic information to the shared bus 20 while using it in a time sharing manner. The local traffic information may be traffic information regarding the node 11, namely traffic information of the node 11 itself and of the links connected to the node 11. The route controller 12 may receive global traffic information regarding the other nodes 11 from the shared bus 20, and update the traffic information table 13 with the global traffic information. The global traffic information may be traffic information regarding the other nodes 11, namely traffic information of the other nodes 11 themselves and of the links connected to the other nodes 11. Further, the route controller 12 may switch packets based on the traffic information table 13.

The traffic information table 13 may be a copy of another traffic information table 13 held by any one of the other nodes 11. This is because each of the nodes 11 in the mesh-based network 10 may hold the traffic information table 13 of the same content. The traffic information table 13 may contain traffic information. For example, the traffic information may represent congested state or non-congested state regarding the node 11 by one bit. Alternatively, the traffic information may represent the number of packets queued in a buffer of the node 11 or transferred to an adjacent node 11 by multiple bits. Further, the traffic information may optionally represent failure or non-failure state of the links connected to the node 11 by one additional bit. Note that, although assumed to hold the traffic information table 13 of the same content, each of the nodes 11 in the mesh-based network 10 may hold the traffic information table 13 which does not include the traffic information regarding its own node 11. That is, the traffic information table 13 in each of the nodes 11 may include the traffic information regarding at least the other nodes 11.

Figure 3:
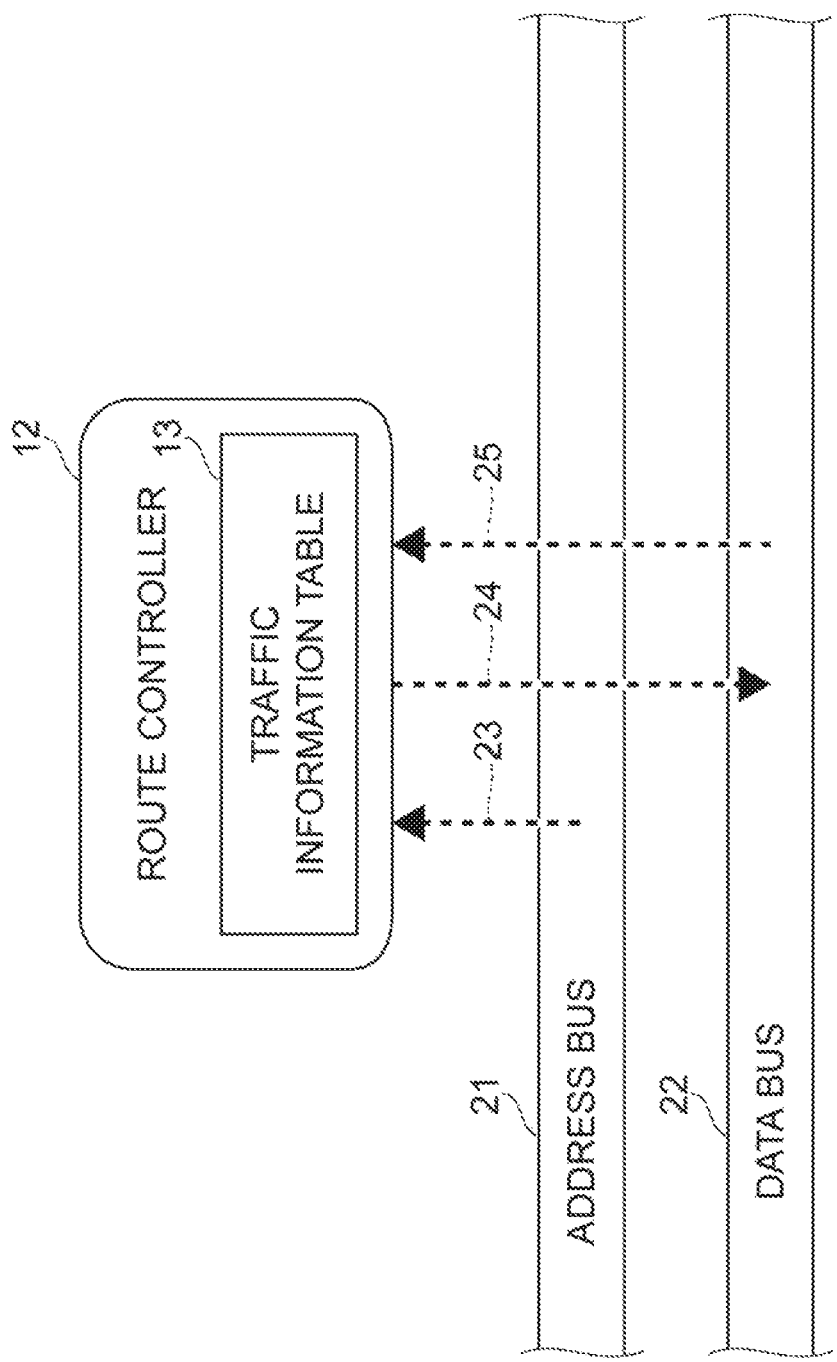
FIG. 3 depicts a schematic diagram of a shared bus according to an embodiment of the present invention.

Referring to FIG. 3, a schematic diagram of the shared bus 20 according to an exemplary embodiment is shown. As shown in the figure, the shared bus 20 may include an address bus 21 and a data bus 22. Note that FIG. 3 also shows the route controller 12 and the traffic information table 13 although they are not structural elements of the shared bus 20.

The address bus 21 may pass addresses regarding the nodes 11. The addresses serve as one example of identification information regarding the nodes 11, and the address bus 21 serves as one example of an identification bus. The data bus 22 may pass traffic information regarding the nodes 11. The data bus 22 serves as one example of the traffic bus. Then, the route controller 12 may constantly monitor the address bus 21 as indicated by a broken arrow 23. If an address on the address bus 21 matches an address regarding the node 11, the route controller 12 may output traffic information regarding the node 11 to the data bus 22 as indicated by a broken arrow 24. If an address on the address bus 21 does not match an address regarding the node 11, the route controller 12 may capture traffic information regarding a corresponding one of the other nodes 11 from the data bus 22 as indicated by a broken arrow 25, and update the traffic information table 13 with the traffic information.

Figure 4:
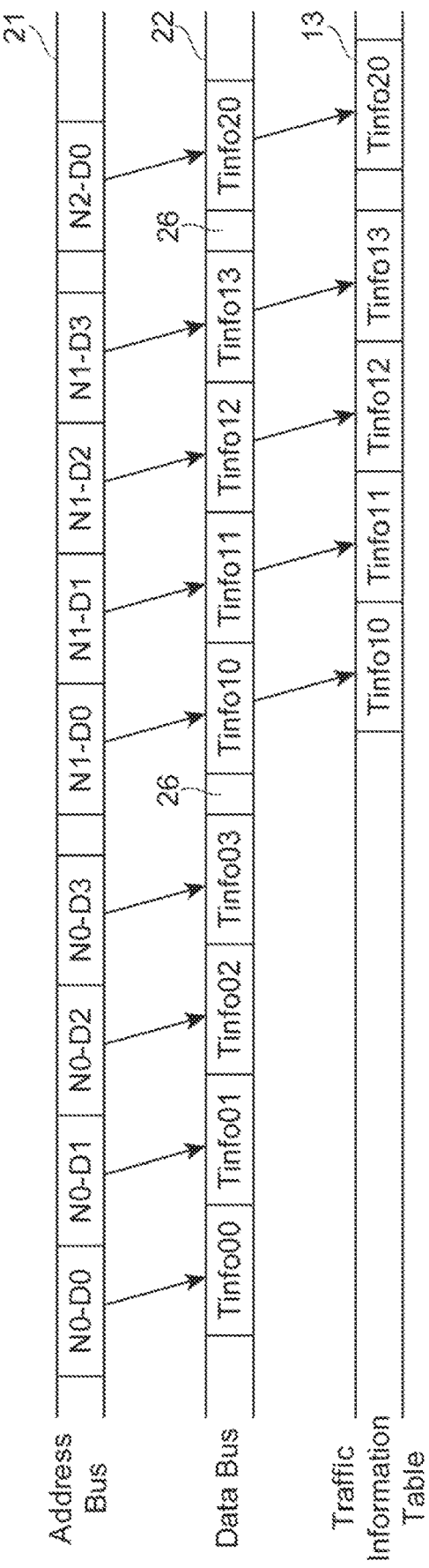
FIG. 4 depicts a schematic diagram of an address bus, a data bus, and a traffic information table illustrated using an example, in accordance with an embodiment of the present invention.

Referring to FIG. 4, a schematic diagram of the address bus 21, the data bus 22, and the traffic information table 13 is illustrated using an example.

In this example, the address regarding the node 11 is assumed to include a node ID and a link direction. The node ID may be an identifier of the node 11. In FIG. 4, the node ID is denoted by "Ni", where i is 0 to n−1. The link direction may be a direction of a link connected to the node 11. In FIG. 4, the link direction is denoted by "Dj", where j is 0 to 3. Further, in the figure, the traffic information of the node "Ni" and the link direction "Dj" is denoted by "Tinfoij". Additionally, in FIG. 4, the traffic information table 13 is assumed to be held by the route controller 12 of the node 11 having a node ID "N0". Hereinafter, the node 11 having a node ID "Ni" is referred to as the "node 11 (Ni)".

In FIG. 4, addresses "N0-D0", "N0-D1", "N0-D2", "N0-D3", "N1-D0", "N1-D1", "N1-D2", "N1-D3", "N2-D0", . . . are assumed to flow through the address bus 21. In this case, the route controller 12 of the node 11 (N0) may output the traffic information "Tinfo00", "Tinfo01", "Tinfo02" and "Tinfo03" to the data bus 22. Meanwhile, the traffic information "Tinfo10", "Tinfo11", "Tinfo12", "Tinfo13", "Tinfo20", . . . are assumed to flow through the data bus 22. In this case, the route controller 12 of the node 11 (N0) may capture the traffic information "Tinfo10", "Tinfo11", "Tinfo12", "Tinfo13", "Tinfo20", . . . from the data bus 22, and update the traffic information table 13 with the traffic information.

Note that guard intervals 26 may also flow through the data bus 22. Each of the guard intervals 26 may be used for separating the traffic information regarding one node 11 and the traffic information regarding another node 11.

Alternatively, the address regarding the node 11 is assumed not to include an individual link selection, namely assumed to include only a node ID. For example, if the traffic information represents congested state or non-congested state of the node 11 itself, the address may include only a node ID.

Figure 5:
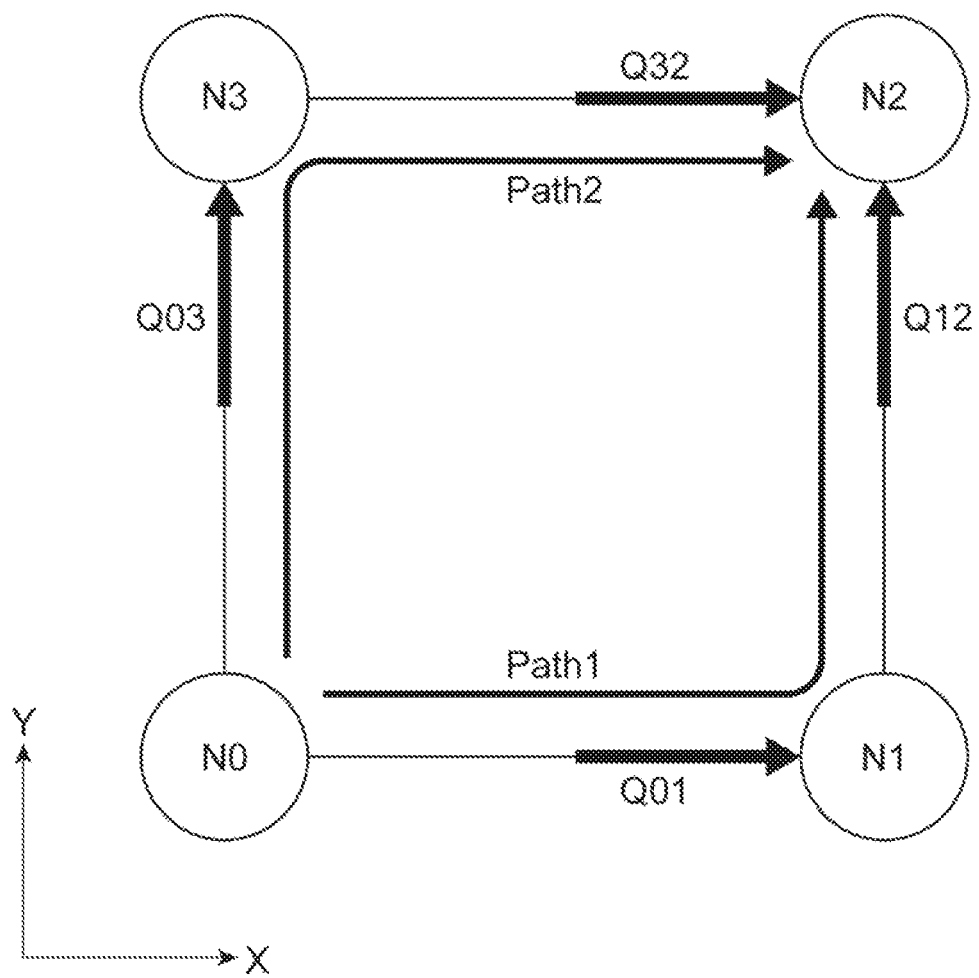
FIG. 5 depicts a schematic diagram explaining a routing scheme of packets according to an embodiment of the present invention.

Referring to FIG. 5, a schematic diagram for explaining a routing scheme of packets according to an exemplary embodiment is shown. In FIG. 5, the node 11 (N0) is assumed to be a source node 11, and the node 11 (N2) is assumed to be a destination node 11.

The exemplary embodiment may employ a routing scheme based on a simple XY routing. In this routing scheme, each of the nodes 11 is assumed to send a packet to an adjacent node 11 so that the sum of the distance which the packet travels in the X direction and the distance which the packet travels in the Y direction is the shortest. No reverse movement is allowed to avoid looping and dead-lock. Thus, in FIG. 5, the packet is to be sent from the node 11 (N0) to the node 11 (N2) through either of a path "Path1" and a path "Path2".

If there are multiple paths from the source node 11 to the destination node 11 as described above, the route controller 12 may look up the traffic information table 13. Then, the route controller 12 may select a path having the least traffic load from the multiple paths. For example, in FIG. 5, the number of the packets on the way from the node 11 (Ni) to the node 11 (Nj) denoted by "Qij" is used as the traffic load. The route controller 12 of the node 11 (N0) may calculate a value for the path "Path1" which is the sum of "Q01" and "Q12", and a value for the path "Path2" which is the sum of "Q03" and "Q32". If the value for the path "Path1" is smaller than the value for the path "Path2", the route controller 12 of the node 11 (N0) may select the path "Path1". On the other hand, if the value for the path "Path2" is smaller than the value for the path "Path1", the route controller 12 of the node 11 (N0) may select the path "Path2".

In the foregoing description, an explanation has been given taking a small portion including four nodes of the mesh-based network 10. However, the above routing scheme may be applicable to the entire mesh-based network 10 of FIG. 1.

In such a case, the routing scheme may have two options. The first option may be to select the path from the source node 11 to the destination node 11 at the source node 11. The information regarding the selected path may be included in the packet. The second option may be to select the path from each node 11 to the destination node 11 at each node 11. At the time when the packet arrives at a node 11, the routing controller 12 of the node 11 may select the appropriate path from the node 11 to the destination node 11.

Figure 6:
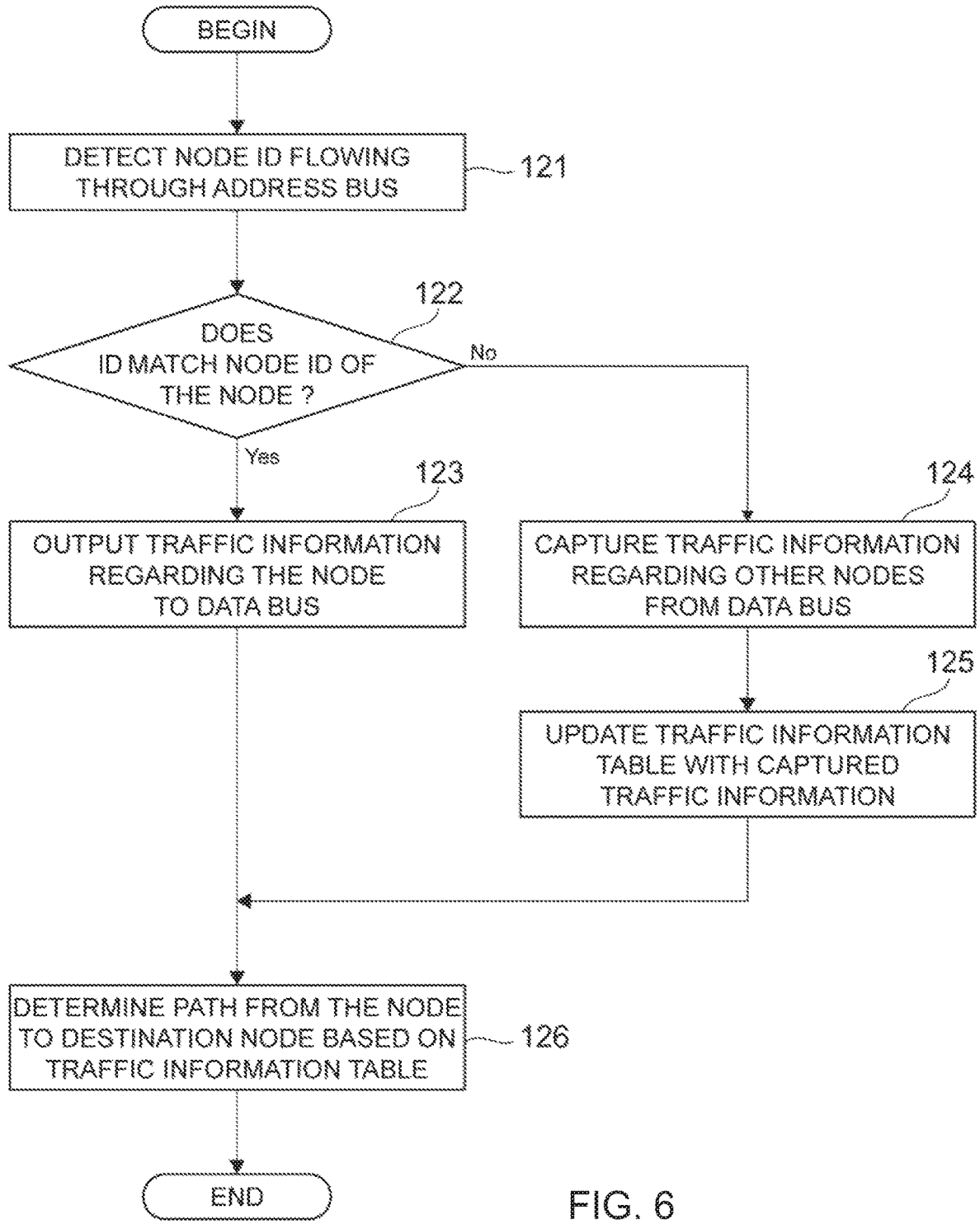
FIG. 6 depicts a flowchart representing an example of an operation performed by a route controller of a node, in accordance with an embodiment of the present invention.

Referring to FIG. 6, a block/flow diagram representing an example of an operation performed by the route controller 12 of the node 11 is shown. Note that, in FIG. 6, the address bus 21 is assumed to pass addresses each including a node ID and a link direction. Further, the routing scheme is assumed to use the above-mentioned second option.

First, the route controller 12 may detect a node ID flowing through the address bus 21 (step 121). Next, the route controller 12 may determine whether or not the detected node ID matches the node ID of the node 11 (step 122).

If the detected node ID matches the node ID of the node 11, the route controller 12 may output traffic information regarding the node 11 to the data bus 22 (step 123).

If, at step 122, the detected node ID does not match the node ID of the node 11, e.g., if the detected node ID is one of node IDs of the other nodes 11, the route controller 12 may capture traffic information regarding the corresponding one of the other nodes 11 from the data bus 22 (step 124). Then, the route controller 12 may update the traffic information table 13 with the captured traffic information (step 125).

Subsequently, when the node 11 receives a packet from the previous adjacent node 11, the route controller 12 may determine a path from the node 11 to the destination node 11 based on the traffic information table 13 (step 126). Thus, the packet may be sent to the next adjacent node 11 along the path determined at step 126.

Next, an alternative exemplary embodiment will be described. The alternative exemplary embodiment is different from the exemplary embodiment described above only in how the addresses and the traffic information flow through the shared bus 20.

Figure 7:
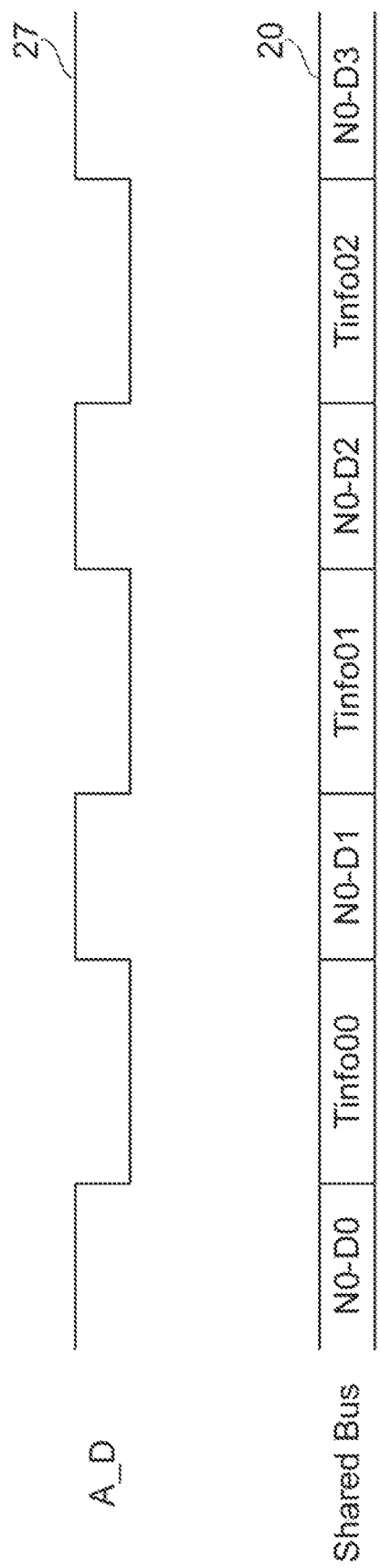
FIG. 7 depicts a schematic diagram of a shared bus according to an alternative exemplary embodiment of the present invention.

Referring to FIG. 7, a schematic diagram of the shared bus 20 according to an alternative exemplary embodiment is shown.

In the alternative exemplary embodiment, the addresses (e.g., "N0-D0") and the traffic information (e.g., "Tinfo00") may flow by time-division multiplexing through the shared bus 20 which is physically one bus. This is the difference from the above described exemplary embodiment in which the shared bus 20 includes the address bus 21 and the data bus 22 which are physically two buses, and the addresses and the traffic information flow through the address bus 21 and the data bus 22, respectively. For example, as shown in FIG. 7, the shared bus 20 may be configured to accompany a wire 27 for transmitting a signal denoted by "A_D" which indicates whether the address is flowing through the shared bus 20 at a timing, or whether the traffic information is flowing through the shared bus 20 at a timing. Specifically, the signal A-D may be set to a high level at the timing when the address is flowing through the shared bus 20, and set to a low level at the timing when the traffic information is flowing through the shared bus 20.

Another alternative exemplary embodiment will be described below.

In another alternative exemplary embodiment, the mesh-based network is assumed to be formed by connecting a large number of the nodes 11. Even in this mesh-based network, the traffic load on the shared bus is not significant because the amount of the traffic information is as small as one bit per link. However, assuming that this mesh-based network is formed by connecting the nodes 11 to a single shared bus 20 as shown in FIG. 1, the number of the nodes 11 is limited due to electrical loads and signal transmit delay time.

In view of this, the alternative exemplary embodiment may employ a hierarchical shared bus structure for a larger number of nodes 11.

Figure 8:
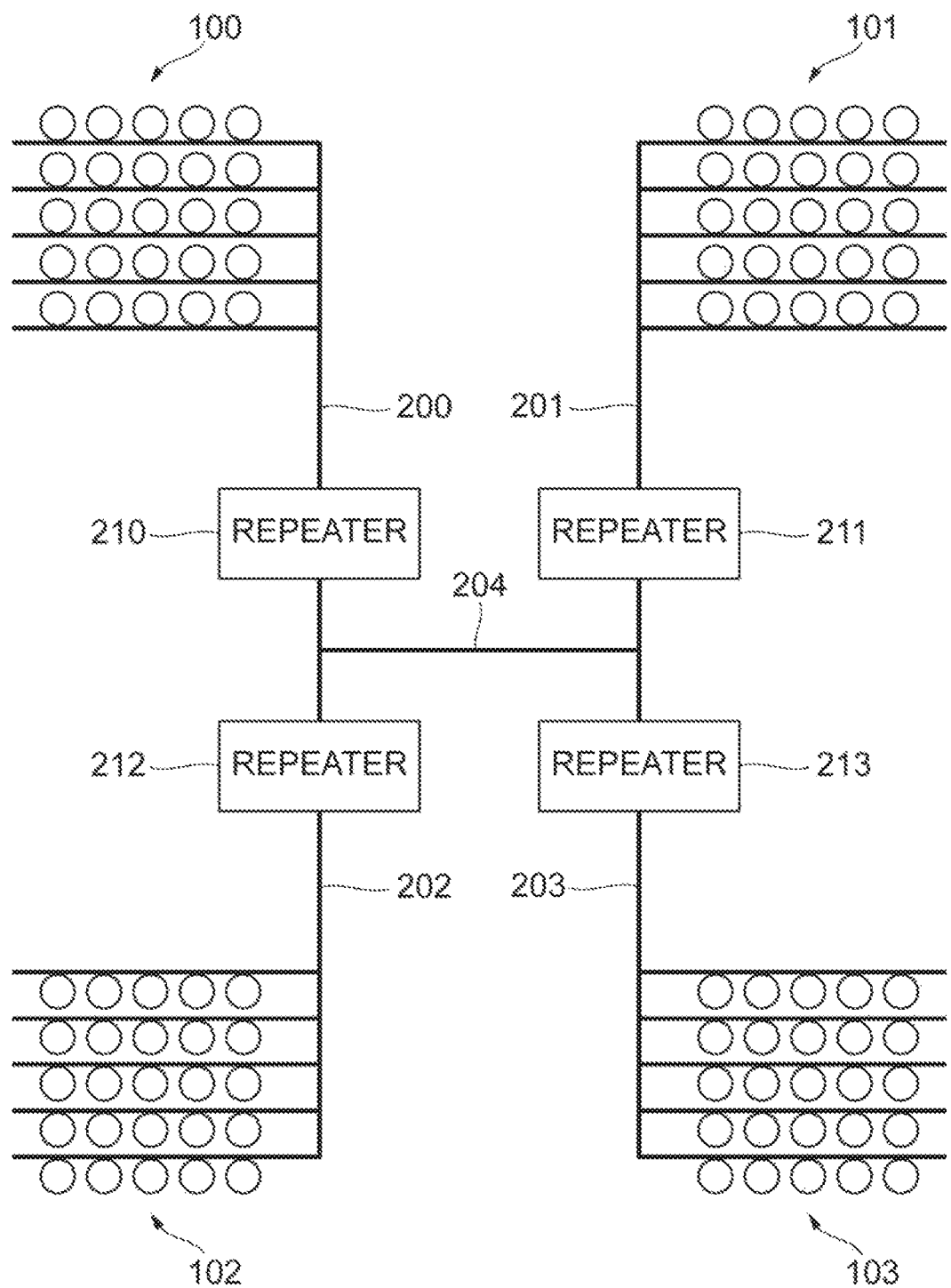
FIG. 8 depicts a block diagram of a mesh-based network system according to an alternative exemplary embodiment of the present invention.

Referring to FIG. 8, a block/flow diagram of a mesh-based network system according to an alternative exemplary embodiment is shown. As shown in the figure, the mesh-based network system may include mesh-based sub-networks 100 to 103, shared sub-buses 200 to 203, a root shared bus 204, and repeaters 210 to 213. In FIG. 8, the mesh-based sub-networks 100 to 103 are illustrated separately from each other for convenience of illustration, although in reality they are adjacent to each other to form one mesh-based network including 10 by 10 nodes.

The mesh-based sub-networks 100 to 103 may be formed by interconnecting the nodes 11 via links (not shown in the figure). For example, the mesh-based sub-network 100 serves as one example of a first network, and the mesh-based sub-network 101 serves as one example of a second network. The nodes 11 in the mesh-based sub-network 100 serves as one example of a first plurality of nodes, and the nodes 11 in the mesh-based sub-network 101 serves as one example of a second plurality of nodes. The links in the mesh-based sub-network 100 serve as one example of a first plurality of links, and the links in the mesh-based sub-network 101 serve as one example of a second plurality of links.

The shared sub-buses 200 to 203 may be buses provided separately from the links in the mesh-based sub-networks 100 to 103, and shared by all of the nodes 11 in the mesh-based sub-networks 100 to 103 by being spread within the mesh-based sub-networks 100 to 103, respectively. For example, the shared sub-bus 200 serves as one example of a first partial bus, and the shared sub-bus 201 serves as one example of a second partial bus.

The repeaters 210 to 213 may be connected to the shared sub-buses 200 to 203, respectively, and connected together to the root shared bus 204. For example, the repeaters 210 and 211 serve as one example of at least one relay device.

Sharing of the traffic information may be performed in two phases. The first phase may be a collection phase. In this phase, the repeaters 210 to 213 may collect the traffic information regarding the nodes 11 in the mesh-based sub-networks 100 to 103, respectively. The second phase may be a broadcast phase. In this phase, the repeaters 210 to 213 may successively broadcast the collected traffic information to the nodes 11 in the mesh-based sub-networks other than the mesh-based sub-networks 100 to 103, respectively. These two phases may be pipelined.

Referring to FIGS. 9A to 9D, schematic diagrams representing an example of an operation of sharing the traffic information in the mesh-based network system of FIG. 8 are shown.

Figure 9:
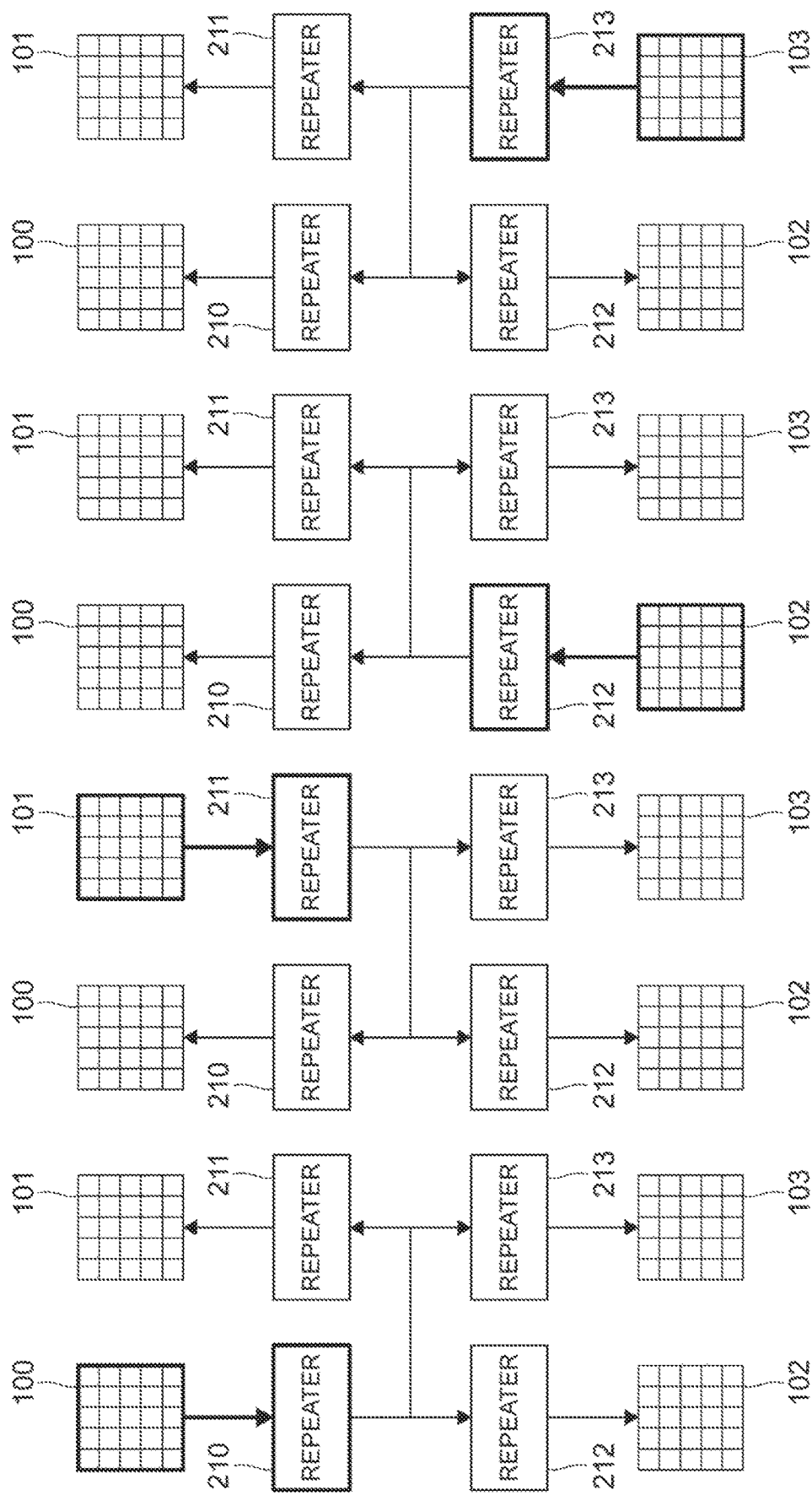
FIG. 9A depicts a schematic diagram representing an example of an operation of sharing traffic information in the mesh-based network system according to an alternative exemplary embodiment of the present invention.
FIG. 9B depicts a schematic diagram representing an example of an operation of sharing traffic information in the mesh-based network system according to an alternative exemplary embodiment of the present invention.
FIG. 9C depicts a schematic diagram representing an example of an operation of sharing traffic information in the mesh-based network system according to an alternative exemplary embodiment of the present invention.
FIG. 9D depicts a schematic diagram representing an example of an operation of sharing traffic information in the mesh-based network system according to an alternative exemplary embodiment of the present invention.

In the first sequence, the repeater 210 may collect the traffic information from the mesh-based sub-network 100 and store the traffic information as indicated by thick frames and a thick arrow of FIG. 9A, and next, the repeater 211 may collect the traffic information from the mesh-based sub-network 101 and store the traffic information as indicated by thick frames and a thick arrow of FIG. 9B. Then, the repeater 212 may collect the traffic information from the mesh-based sub-network 102 and store the traffic information as indicated by thick frames and a thick arrow of FIG. 9C, and next, the repeater 213 may collect the traffic information from the mesh-based sub-network 103 and store the traffic information as indicated by thick frames and a thick arrow of FIG. 9D.

In the next sequence, the repeater 210 may broadcast the traffic information stored therein to the mesh-based sub-networks 101, 102, and 103 as indicated by thin frames and thin arrows of FIG. 9A, and next, the repeater 211 may broadcast the traffic information stored therein to the mesh-based sub-networks 100, 102 and 103 as indicated by thin frames and thin arrows of FIG. 9B. Then, the repeater 212 may broadcast the traffic information stored therein to the mesh-based sub-networks 100, 101 and 103 as indicated by thin frames and thin arrows of FIG. 9C, and next, the repeater 213 may broadcast the traffic information stored therein to the mesh-based sub-networks 100, 101 and 102 as indicated by thin frames and thin arrows of FIG. 9D.

Next, a hardware configuration of each of the nodes 11 in the mesh-based network 10 or the mesh-based sub-networks 100 to 103 is described. Note that each of the nodes 11 may be implemented with a computer 90, so the description will be for the hardware configuration of the computer 90.

Figure 10:
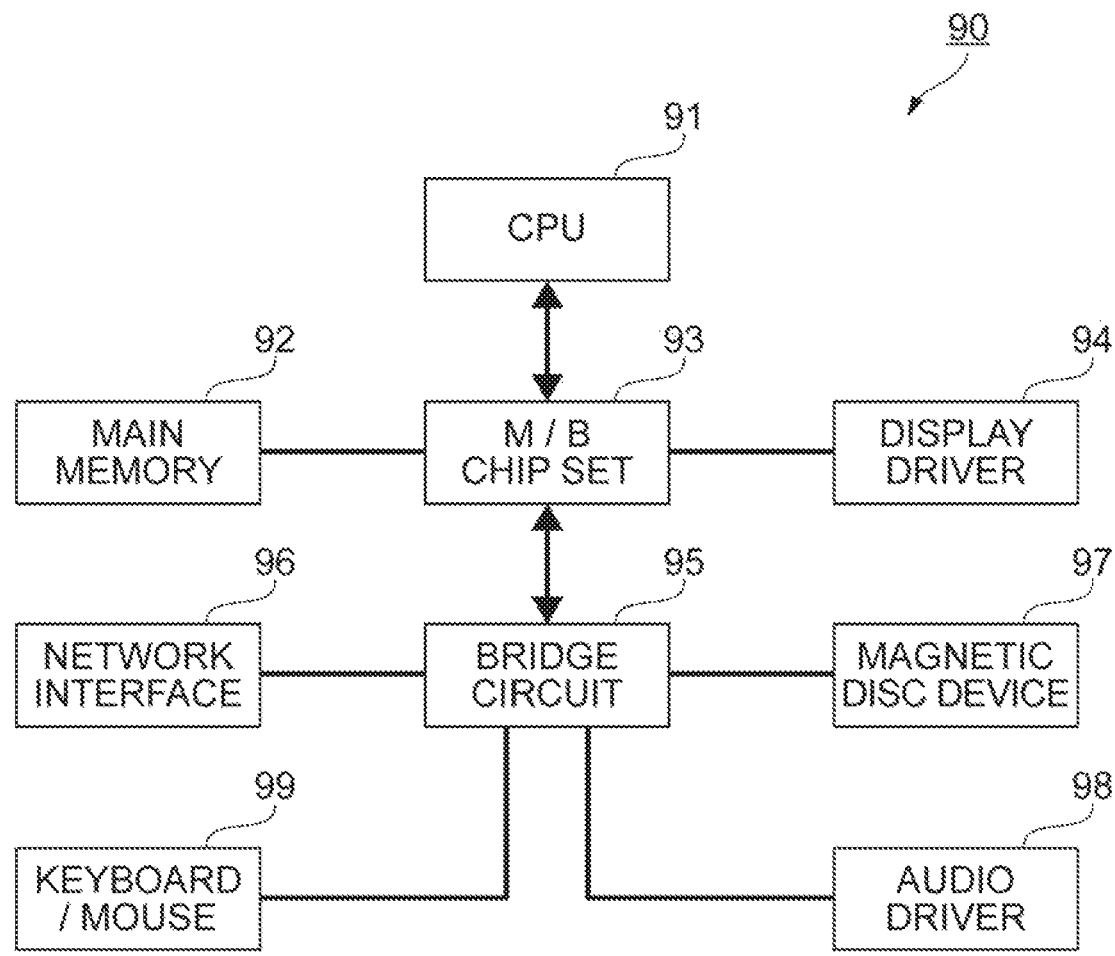
FIG. 10 depicts an example of a hardware configuration of a computer according to exemplary embodiments of the present invention.

Referring to FIG. 10, an example of a hardware configuration of the computer 90 is shown. As shown in the figure, the computer 90 may include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

In FIG. 10, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for routing data by a node from a plurality of nodes connected by links to form a network, the method comprising:
   feeding, to a global bus, local traffic information regarding the node, the global bus being provided separately from the links and spread within the network;
   obtaining, from the global bus, global traffic information regarding other nodes from the plurality of nodes; and
   switching a routing path of the data based on at least the local traffic information regarding the other nodes.

2. The method of claim 1, wherein:
   feeding includes feeding, to the global bus, the local traffic information regarding the node in response to detecting identification information regarding the node flows through the global bus; and
   obtaining includes obtaining, from the global bus, the global traffic information regarding the other nodes in response to detecting identification information regarding the other nodes flows through the global bus.

3. The method of claim 2, wherein:
   the global bus includes an identification bus and a traffic bus, the identification bus and the traffic bus being physically two buses;
   feeding includes feeding, to the traffic bus, the local traffic information regarding the node in response to detecting the identification information regarding the node flows through the identification bus; and
   obtaining includes obtaining, from the traffic bus, the global traffic information regarding the other nodes in response to detecting the identification information regarding the other nodes flows through the identification bus.

4. The method of claim 2, wherein:
   the global bus is physically one bus;
   the feeding includes feeding, to the physically one bus, the local traffic information regarding the node in response to detecting that the identification information regarding the node flows through the physically one bus; and
   the obtaining includes obtaining, from the physically one bus, the global traffic information regarding the other nodes in response to detecting that the identification information regarding the other nodes flows through the physically one bus, the identification information regarding the other nodes flowing together with the traffic information regarding the other nodes by time-division multiplexing through the physically one bus.

5. A computer program product for routing data by a computer from a plurality of computers connected by links to form a network, the computer program product comprising a non-transitory computer readable storage medium having program instructions embodied therewith, the program instructions executable by the computer to cause the computer to:
  feed, to a global bus, local traffic information regarding the computer, the global bus being provided separately from the links and spread within the network;
  obtain, from the global bus, global traffic information regarding other computers from the plurality of computers; and
  switch a routing path of the data based on at least the local traffic information regarding the other computers.

6. An apparatus for routing data, the apparatus being one of a plurality of apparatuses connected by links to form a network, the apparatus comprising:
  a processor; and
  a memory coupled to the processor, wherein the memory comprises program instructions executable by the processor to cause the processor to:
    feed, to a global bus, local traffic information regarding the apparatus, the global bus being provided separately from the links and spread within the network;
    obtain, from the global bus, global traffic information regarding other apparatuses from the plurality of apparatuses; and
    switch a routing path of the data based on at least the local traffic information regarding the other apparatuses.

7. A network system for routing data in a network, the network system comprising:
  a plurality of nodes, each node being configured to route the data;
  a plurality of links, each link being configured to connect two of the plurality of nodes to form the network; and
  a global bus provided separately from the plurality of links and spread within the network, wherein each node from the plurality of nodes feeds, to the global bus, local traffic information regarding the each node, obtains, from the global bus, global traffic information regarding other nodes from the plurality of nodes, and switches a routing path of the data based on at least the local traffic information regarding the other nodes.

8. The network system of claim 7, further comprising a generator configured to generate identification information regarding any of the plurality of nodes and send the identification information to the global bus, wherein:
  the each node feeds, to the global bus, the local traffic information regarding the each node in response to detecting identification information regarding the each node flows through the global bus, and obtains, from the global bus, the global traffic information regarding the other nodes in response to detecting identification information regarding the other nodes flows through the global bus.

9. The network system of claim 8, wherein:
  the global bus includes an identification bus and a traffic bus, the identification bus and the traffic us being physically two buses; and
  the each node feeds, to the traffic bus, the local traffic information the each node in response to detecting that the identification information regarding the each node flows through the identification bus, and obtains, from the traffic bus, the global traffic information regarding the other nodes in response to detecting that the identification information regarding the other nodes flows through the identification bus.

10. The network system of claim 8, wherein:
  the global bus is physically one bus; and
  the each node feeds, to the physically one bus, the local traffic information regarding the each node in response to detecting the identification information regarding the each node flows through the physically one bus, and obtains, from the physically one bus, the global traffic information regarding the other nodes in response to detecting the identification information regarding the other nodes flows through the physically one bus, the identification information regarding the other nodes flowing together with the global traffic information regarding the other nodes by time-division multiplexing through the physically one bus.

11. The network system of claim 7, further comprising at least one relay device which connects a plurality of buses, wherein:
  the network includes a first network and a second network;
  the plurality of nodes include a first plurality of nodes and a second plurality of nodes, the plurality of links include a first plurality of links and a second plurality of links, each of the first plurality of links connecting two of the first plurality of nodes to form the first network, and each of the second plurality of links connecting two of the second plurality of nodes to form the second network;
  the global bus includes a first partial bus and a second partial bus, the first partial bus being provided separately from the first plurality of links and spread within the first network, and the second partial bus being provided separately from the second plurality of links and spread within the second network; and
  the at least one relay device connects the first partial bus and the second partial bus.

12. The network system of claim 11, wherein the at least one relay device receives first traffic information regarding the first plurality of nodes from the first network at a first timing and receives second traffic information regarding the second plurality of nodes from the second network at a second timing different from the first timing.

13. The network system of claim 11, wherein the at least one relay device sends first traffic information regarding the first plurality of nodes to the second network at a first timing and sends second traffic information regarding the second plurality of nodes to the first network at a second timing different from the first timing.

* * * * *